United States Patent Office 3,245,775
Patented Apr. 12, 1966

3,245,775
METHOD OF INCREASING THE SUGAR/SUGAR CANE WEIGHT RATIO
Rudolf Koloman Pfeiffer, Cambridge, England, assignor, by mesne assignments, to Tenneco Chemicals, Inc., a corporation of Delaware
No Drawing. Filed Jan. 22, 1963, Ser. No. 253,056
Claims priority, application Great Britain, Feb. 1, 1962, 3,962/62
17 Claims. (Cl. 71—2.6)

The present invention relates to a process for the treatment of sugar cane to increase the proportion of sugar per unit weight of crop.

It has surprisingly been found that if sugar cane is sprayed with 2,3,6-trichlorobenzoic acid or a salt thereof at a late stage of development, the sugar content of the cane per unit weight of crop is very substantially increased, or its decline after the optimum stage for harvest substantially retarded.

This has the result, inter alia, that the volume of sugar cane to be processed per ton of sugar produced is significantly reduced, thus enabling a higher output of sugar from the same processing unit.

Accordingly the present invention is for a process for the manufacture of sugar which comprises subjecting to the sugar extraction process sugar cane which has been sprayed at a period not more than 2 months from harvesting with 2,3,6-trichlorobenzoic acid or a salt thereof.

Accordingly the present invention is also for the process of the treatment of a growing sugar cane crop which comprises spraying the crop at a period not more than 2 months from harvesting with 2,3,6-trichlorobenzoic acid or a salt thereof.

The term "spraying" is used in the specification to cover all the methods of application of agricultural chemicals. Most usually this comprises the application of an aqueous spray.

The treatment of the sugar cane crop requires to be carried out when the crop is more than about 4 feet in height. Suitably the spraying of the sugar cane in accordance with the invention is carried out at more than about 10 days, for example 2 weeks, but not more than 6 weeks, before harvest. It is generally preferred to carry out the treatment about 2–4 weeks before harvest.

The rate of application of the 2,3,6-trichlorobenzoic acid or its salts (in the latter case expressed as the free acid) is desirably in the range 0.5–4 pounds per acre, although the rate of application may be less than this, in which case the effect is small, or greater than this, in which case no significant increase in sugar is obtained commensurate with the additional usage of chemical and risk of adverse effect in the crop is incurred. It is preferred to use 1–2 pounds per acre of 2,3,6-trichlorobenzoic acid.

The concentration in the spray of 2,3,6-trichlorobenzoic acid or its salts employed is not particularly significant, and the spraying may be carried out at any of the conventional volumes corresponding to the types of equipment used. Thus for example the 2,3,6-trichlorobenzoic acid may be sprayed at a volume of from 2 gallons to 100 gallons per acre. Where the 2,3,6-trichlorobenzoic acid is formulated as a dust, the concentration of the 2,3,6-trichlorobenzoic acid will normally lie in the range 20–80% by weight.

2,3,6-trichlorobenzoic acid is not very soluble in water, and usually this is more conveniently formulated as a salt, many of which are water soluble. It will be understood of course that it is generally most convenient to spray agricultural chemicals as an aqueous solution or suspension.

The salts of 2,3,6-trichlorobenzoic acid which may be mentioned include metal salts such as sodium, potassium, copper, chromium, magnesium salts and the like; the ammonium salt; amine salts such as trimethylamine, triethylamine, triethanolamine salts and the like. It is preferred to use the alkali metal salts such as sodium and potassium salts, or mixed sodium/potassium salts.

2,3,6-trichlorobenzoic acid is generally made by a chlorination process, with the result that the acid obtained is a mixture of chlorobenzoic acids containing other trichlorobenzoic acid isomers, dichlorobenzoic acids and tetrachlorobenzoic acids. There is no requirement to purify the trichlorobenzoic acid, and the crude commercial product comprising a mixture of chlorobenzoic acids containing 2,3,6-trichlorobenzoic acid may be used if desired. If so desired pure 2,3,6-trichlorobenzoic acid may be used in the process according to the present invention.

Of the other chlorobenzoic acids 2,3,5,6-tetrachlorobenzoic acid and 2,6-dichlorobenzoic acid possess some activity in the process according to the present invention. The activity of 2,3,5,6-tetrachlorobenzoic acid is about half that of 2,3,6-trichlorobenzoic acid, and the activity of 2,6-dichlorobenzoic acid is about one-tenth that of 2,3,6-trichlorobenzoic acid. Where these acids are present in the composition in any substantial proportion, in calculating the rate of application appropriate allowance should be made for their presence corresponding to their relative activities.

The 2,3,6-trichlorobenzoic acid or its salts may be formulated in any suitable way for application to the sugar cane crop. Generally it is most convenient merely to use an aqueous solution of a water soluble salt, for example the sodium or potassium salts of 2,3,6-trichlorobenzoic acid with or without a wetting agent. However if so desired the 2,3,6-trichlorobenzoic acid or its salts may be formulated in any of the conventional ways including one or more of the materials organic solvents, solid diluents, wetting agents, antiflocculants and the like, so as to produce a solution or suspension or a dust.

Thus, for example, the 2,3,6-trichlorobenzoic acid may be dissolved in a high boiling hydrocarbon, or an organic solvent such as methyl Cellosolve, with or without a wetting agent, and the resulting solution used as such or dispersed in water.

Alternatively the 2,3,6-trichlorobenzoic acid or its salts may be mixed with solid inert media such as, for example, clays, sands, talc, mica, fertilizers and the like, with or without a wetting agent, so as to form a dust, or a wettable product which may be used as a dispersion in water.

The wetting agents used may comprise anionic compounds such as for example soaps, fatty sulphate esters such as dodecyl sodium sulphate, fatty aromatic sulphonates such as alkylbenzenesulphonates or butyl naphthalene sulphates, more complex fatty sulphonates such as the amide condensation product of oleic acid and N-methyl taurine or sodium sulphonate of dioctyl succinic acid. The wetting agents may also comprise non-ionic agents such as for example condensation products of fatty acids, fatty alcohols or fatty substituted phenols with ethylene oxide, or fatty esters and ethers of sugar or polyhydric alcohols, or the products obtained from the latter by condensation with ethylene oxide, or the products known as block copolymers of ethylene oxide and propylene oxide.

The wetting agents may also comprise cationic agents such as for example cetyl trimethylammonium bromide and the like.

If desired the composition for spraying in accordance with the present invention may include other agricultural chemicals such as fungicides, pesticides, other herbicides, plant growth regulants and the like.

According to one embodiment of the invention a herbicide such as a phenoxyaliphatic acid for example 2,4- dichlorophenoxyacetic acid or 2,4,5-trichlorophenoxyacetic acid is incorporated with the 2,3,6-trichlorobenzoic acid. According to another embodiment of the invention 2-methyl-4-chlorophenoxyacetic acid is incorporated with the 2,3,6-trichlorobenzoic acid, suitably in a proportion comprising 0.5–10 parts per part of 2,3,6-trichlorobenzoic acid.

The following examples are given to illustrate the present invention.

*Example 1*

Half of a crop of sugar cane was sprayed 30 days before harvesting with an aqueous solution of the mixed sodium/potassium salts of 2,3,6-trichlorobenzoic acid at a volume of 10 gallons per acre and at a rate of 1.5 pounds of 2,3,6-trichlorobenzoic acid per acre. At the time of spraying, a test showed that it was necessary to process 12.2 tons of cane in order to obtain one ton of sugar. After 30 days the treated sugar cane was harvested and it was found that it was only necessary to process 9.0 tons of sugar cane to obtain 1 ton of sugar. At the same time the untreated sugar cane was also harvested, and it was found necessary to process 11.2 tons of sugar cane to obtain 1 ton of sugar. The weight increases of the treated and untreated sugar cane crops after the spraying date were substantially the same.

*Example 2*

Half of a crop of sugar cane was sprayed 28 days before harvesting with an aqueous solution of a composition comprising 2,3,6-trichlorobenzoic acid, sodium salt, and 2-methyl-4-chlorophenoxy acetic acid, sodium salt, and 2-methyl-4-chlorophenoxy acetic acid, sodium salt, in a weight ratio of 3:1, and wetting agents, at a volume of 10 gallons per acre containing 0.3 pound of 2-methyl-4-chlorophenoxy acetic acid and 0.1 pound of 2,3,6-trichlorobenzoic acid per gallon. At the time of spraying a test showed that it was necessary to process 12.7 tons of cane in order to obtain one ton of sugar. After 28 days the treated sugar cane was harvested and it was found that it was only necessary to process 9.5 tons of sugar cane to obtain 1 ton of sugar. At the same time the untreated sugar cane was also harvested, and it was found necessary to process 11.9 tons of sugar cane to obtain 1 ton of sugar. The weight increases of the treated and untreated sugar cane crops after the spraying date were substantially the same.

I claim:

1. A method of increasing the sugar/sugar cane weight ratio in sugar cane crop which comprises applying to the crop at a period not more than two months prior to harvesting, a compound selected from the group consisting of 2,3,6-trichlorobenzoic acid and alkali metal salt, copper salt, chromium salt, magnesium salt, ammonium salt and amine salt thereof in amount sufficient to increase the percentage of sugar in the crop and at the rate of 0.5 to 4 pounds of said compound per acre of crop.

2. A method of increasing the sugar/sugar cane weight ratio in sugar cane crop which comprises applying to the crop at a period not more than two months prior to harvesting and when the crop is more than about 4 feet in height, a compound selected from the group consisting of 2,3,6-trichlorobenzoic acid and alkali metal salt, copper salt, chromium salt, magnesium salt, ammonium salt and amine salt thereof in amount sufficient to increase the percentage of sugar in the crop and at the rate of 0.5 to 4 pounds of said compound per acre of crop.

3. A method of increasing the sugar/sugar cane weight ratio in sugar cane crop which comprises applying to the crop at a period not more than two months prior to harvesting but more than about 10 days before harvest, a compound selected from the group consisting of 2,3,6-trichlorobenzoic acid and alkali metal salt, copper salt, chromium salt, magnesium salt, ammonium salt and amine salt thereof in amount sufficient to increase the percentage of sugar in the crop and at the rate of 0.5 to 4 pounds of said compound per acre of crop.

4. A method of increasing the sugar/sugar cane weight ratio in sugar cane crop which comprises applying to the crop at a period not more than about six weeks prior to harvesting, a compound selected from the group consisting of 2,3,6-trichlorobenzoic acid and alkali metal salt, copper salt, chromium salt, magnesium salt, ammonium salt and amine salt thereof in amount sufficient to increase the percentage of sugar in the crop and at the rate of 0.5 to 4 pounds of said compound per acre of crop.

5. A method of increasing the sugar/sugar cane weight ratio in sugar cane crop which comprises applying sodium 2,3,6-trichlorobenzoate to the crop at a period not more than two months prior to harvesting but more than about 10 days before harvest, in an amount sufficient to increase the percentage of sugar in the crop and at the rate of 0.5 to 4 pounds per acre of crop.

6. A method of increasing the sugar/sugar cane weight ratio in sugar cane crop which comprises applying potassium 2,3,6-trichlorobenzoate to the crop at a period not more than two months prior to harvesting but more than about 10 days before harvest, in an amount sufficient to increase the percentage of sugar in the crop and at the rate of 0.5 to 4 pounds per acre of crop.

7. A method according to claim 1 wherein the said compound is formulated with at least one agricultural carrier selected from the group consisting of organic solvents, solid diluents, wetting agents and antiflocculants.

8. A method of increasing the sugar/sugar cane weight ratio in sugar cane crop which comprises applying 2,3,6-trichlorobenzoic acid to the crop at a period not more than two months prior to harvesting but more than about 10 days before harvest, in an amount sufficient to increase the percentage of sugar in the crop and at the rate of 0.5 to 4 pounds per acre of crop.

9. A method of increasing the sugar/sugar cane weight ratio in sugar cane crop which comprises applying alkali metal salt of 2,3,6-trichlorobenzoic acid to the crop at a period not more than two months prior to harvesting but more than about 10 days before harvest, in an amount sufficient to increase the percentage of sugar in the crop and at the rate of 0.5 to 4 pounds per acre of crop.

10. A method of increasing the sugar/sugar cane weight ratio in sugar cane crop which comprises applying ammonium salt of 2,3,6-trichlorobenzoic acid to the crop at a period not more than two months prior to harvesting but more than about 10 days before harvest, in an amount sufficient to increase the percentage of sugar in the crop and at the rate of 0.5 to 4 pounds per acre of crop.

11. A method of increasing the sugar/sugar cane weight ratio in sugar cane crop which comprises applying amine salt of 2,3,6-trichlorobenzoic acid to the crop at a period not more than two months prior to harvesting but more than about 10 days before harvest, in an amount sufficient to increase the percentage of sugar in the crop and at the rate of 0.5 to 4 pounds per acre of crop.

12. A method of increasing the sugar/sugar cane weight ratio in sugar cane crop which comprises spraying the crop at a period about 2 to 4 weeks before harvest with an agricultural spray containing a compound selected from the group consisting of 2,3,6-trichlorobenzoic acid and alkali metal salt, copper salt, chromium salt, magnesium salt, ammonium salt and amine salt thereof in amount sufficient to increase the percentage of sugar in the crop and at the rate of 0.5 to 4 pounds of said compound per acre of crop.

13. A method of increasing the sugar/sugar cane weight ratio in sugar cane crop which comprises spraying the crop at a period about 2 to 4 weeks before harvest with an agricultural spray containing a compound selected from the group consisting of 2,3,6-trichlorobenzoic acid and alkali metal salt, copper salt, chromium salt, magnesium salt, ammonium salt and amine salt thereof, the rate of application of said compound expressed as the free acid, being in the range 0.5 to 4 pounds per acre.

14. A method of increasing the sugar/sugar cane weight ratio in sugar cane crop which comprises spraying the crop at a period about 2 to 4 weeks before harvest with an agricultural spray containing a compound selected from the group consisting of 2,3,6-trichlorobenzoic acid and alkali metal salt, copper salt, chromium salt, magnesium salt, ammonium salt and amine salt thereof, the rate of application of said compound expressed as the free acid, being in the range 1 to 2 pounds per acre.

15. A method according to claim 12 wherein the spray is an aqueous spray.

16. A method according to claim 1, wherein the 2,3,6-trichlorobenzoic acid is comprised in a mixture of chlorobenzoic acids.

17. A method of increasing the sugar/sugar cane weight ratio in sugar cane crop which comprises spraying the crop at a period not more than 2 months before harvesting but more than about 10 days before harvest with a mixture comprising (a) a compound selected from the group consisting of 2,3,6-trichlorobenzoic acid and alkali metal salt, copper salt, chromium salt, magnesium salt, ammonium salt and amine salt thereof in amount sufficient to increase the percentage of sugar in the crop, and (b) a phenoxyacetic acid selected from the group consisting of 2-methyl-4-chlorophenoxyacetic acid and 2,4,5-trichlorophenoxyacetic acid, the rate of application being in the range of 0.5 to 4 pounds of said compound per acre of crop.

References Cited by the Examiner
UNITED STATES PATENTS

| | | | |
|---|---|---|---|
| 2,978,838 | 4/1961 | Beatty | 71—2.6 |
| 3,008,818 | 11/1961 | Guth | 71—2.6 |

LEWIS GOTTS, *Primary Examiner.*

JULIAN S. LEVITT, *Examiner.*